May 13, 1952  V. A. D. SHREFFLER  2,596,298
PISTON HEAD CONSTRUCTION FOR HYDRAULIC BRAKE CYLINDERS
Filed June 12, 1950

Vivian A. Dake Shreffler
INVENTOR
BY CA Snow & Co.
ATTORNEYS.

Patented May 13, 1952

2,596,298

UNITED STATES PATENT OFFICE 2,596,298

PISTON HEAD CONSTRUCTION FOR HYDRAULIC BRAKE CYLINDERS

Vivian A. Dake Shreffler, Barnsdall, Okla., assignor of one-half to Killis W. Jeter, Sr.

Application June 12, 1950, Serial No. 167,548

1 Claim. (Cl. 60—54.6)

This invention relates to hydraulic brake systems, and more particularly to the construction of the pistons and rubber cups operating within the cylinders of the system. By way of illustration, it might be stated that the pistons and cylinders of hydraulic brake systems become scored resulting in leakage of the braking fluid which appreciably reduces the braking power of the system and frequently renders the brakes inadequate for accomplishing their purpose.

It is therefore the primary object of the present invention to provide pistons for use in the usual brake cylinders of a hydraulic braking system, the pistons being of a construction to cause the rubber cups used between adjacent pistons of a cylinder, to expand against the wall of the cylinder, thereby insuring a fluid tight connection even though the pistons or cylinder wall become scored.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing

Figure 1:
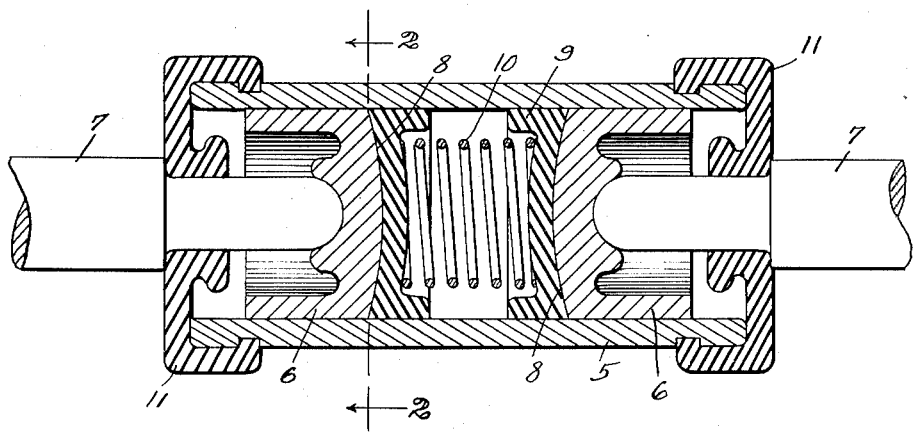
Figure 1 is a longitudinal sectional view through a cylinder equipped with pistons and rubber cups, constructed in accordance with the invention.
Figure 2:
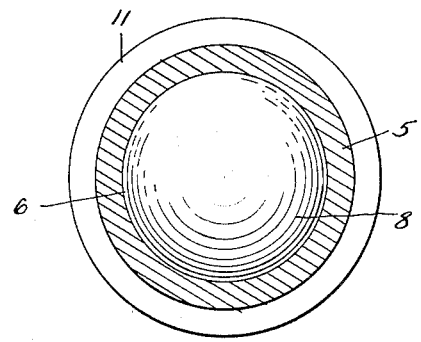
Figure 2 is a sectional view taken on line 2—2 of Fig. 1.

Referring to the drawing in detail, the reference character 5 indicates the cylinder of a hydraulic braking system, in which the pistons 6 operate, the pistons being subjected to oil pressure to cause the pistons to separate and operate the rods 7 for expanding the brake shoes against the brake drum.

As clearly shown by Fig. 1 of the drawing, the inner ends of the pistons 6 are convex as at 8, against which convex surfaces, the rubber cups 9 rest, and since the cups 9 are of rubber, they will conform in contour to the convex ends 8 of the pistons, causing a lateral pressure against the rubber cups, to cause them to be deflected against the cylinder wall, due to the oil pressure between the cups.

The coiled spring indicated at 10 is disposed between the cups, with its ends seated within grooves of the cups, the spring 10 acting to keep the rubber cups in close engagement with their pistons at all times.

Secured over the ends of the cylinder 5, are the boots 11 that protect the cylinder bore against foreign matter entering the cylinder at the ends thereof.

From the foregoing it will be seen that due to the construction of the convex or dome-shaped pistons, the rubber cups mounted thereon, will be caused to expand into close contact with the wall of the cylinder, providing a fluid-tight leakproof connection between the cups and cylinder to insure the true operation of the pistons.

Having thus described the invention, what is claimed is:

In a fluid brake cylinder, a body, opposed pistons operating within the body, the inner ends of the pistons being convex, flexible cup washers having permanently concaved surfaces fitted over the convex ends of the pistons, said convex surfaces of said pistons directing a lateral pressure on the washers forcing the washers into contact with the wall of the body.

VIVIAN A. DAKE SHREFFLER.

REFERENCES CITED

The following references are of record in the file of this patent:

UNITED STATES PATENTS

| Number | Name | Date |
|---|---|---|
| 2,059,444 | Dick | Nov. 3, 1936 |
| 2,191,054 | Weihe | Feb. 20, 1940 |
| 2,417,476 | Finley | Mar. 18, 1947 |

FOREIGN PATENTS

| Number | Country | Date |
|---|---|---|
| 504,321 | Germany | Aug. 1, 1930 |